United States Patent
Deville et al.

(10) Patent No.: US 11,111,427 B2
(45) Date of Patent: Sep. 7, 2021

(54) SELECTIVE SALT MANAGEMENT FOR WELLBORE FLUIDS USING MICROGEL PARTICLES

(71) Applicant: HALLIBURTON ENERGY SERVICES, INC., Houston, TX (US)

(72) Inventors: Jay P. Deville, Spring, TX (US); William W. Shumway, Spring, TX (US); Lee J. Hall, The Woodlands, TX (US); Xiaobo Hu, Chapel Hill, NC (US); Sergey Sheyko, Chapel Hill, NC (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/765,322

(22) PCT Filed: Dec. 29, 2017

(86) PCT No.: PCT/US2017/069062
§ 371 (c)(1),
(2) Date: May 19, 2020

(87) PCT Pub. No.: WO2019/132993
PCT Pub. Date: Jul. 4, 2019

(65) Prior Publication Data
US 2020/0354626 A1  Nov. 12, 2020

(51) Int. Cl.
*E21B 37/00* (2006.01)
*E21B 43/34* (2006.01)
*C09K 8/60* (2006.01)
*C09K 8/88* (2006.01)

(52) U.S. Cl.
CPC ............. *C09K 8/608* (2013.01); *C09K 8/88* (2013.01); *E21B 37/00* (2013.01); *E21B 43/34* (2013.01); *C09K 2208/12* (2013.01)

(58) Field of Classification Search
CPC ...... C09K 8/608; C09K 8/88; C09K 2208/12; E21B 37/00; E21B 43/34
See application file for complete search history.

(56) References Cited

U.S. PATENT DOCUMENTS

| | | | |
|---|---|---|---|
| 4,552,217 A * | 11/1985 | Wu | C09K 8/887 |
| | | | 166/270 |
| 4,964,467 A | 10/1990 | Holtmyer et al. | |
| 10,414,963 B2 * | 9/2019 | Zhou | C09K 8/887 |
| 2003/0213593 A1 | 11/2003 | Bouwmeester et al. | |

(Continued)

FOREIGN PATENT DOCUMENTS

| | | |
|---|---|---|
| WO | 2016182553 A1 | 11/2016 |
| WO | 2017048249 A1 | 3/2017 |

OTHER PUBLICATIONS

International Search Report and Written Opinion issued in PCT Application No. PCT/US2017/069062 dated Sep. 27, 2018.

*Primary Examiner* — Silvana C Runyan
(74) *Attorney, Agent, or Firm* — McAfee & Taft

(57) ABSTRACT

An aqueous-based well treatment fluid for and methods of controlling metal ions in a well, wherein the treatment fluid and methods use one or more polymer microgels, which comprise a plurality of polymer particles. Each polymer particle has a polymeric backbone bearing at least one moiety where such moiety is a chelating agent capable of boding with a metal ion.

20 Claims, 3 Drawing Sheets

(56) References Cited

U.S. PATENT DOCUMENTS

2007/0254378 A1 11/2007 Zhang et al.
2008/0194431 A1\* 8/2008 Fu ......................... C09K 8/685
　　　　　　　　　　　　　　　　　　　　　　507/219
2010/0307753 A1 12/2010 Rey et al.

\* cited by examiner

SELECTIVE SALT MANAGEMENT FOR WELLBORE FLUIDS USING MICROGEL PARTICLES

FIELD

The present invention relates generally to well treatment operations, and more specifically, to methods of selectively removing certain ions from aqueous-based well treatment fluids.

BACKGROUND

Treatment fluids are used in many well-based operations. For example, completion brines are water-based solution of inorganic salts used as a well-control fluid during the completion and workover phases of well operations. Often, the salts in brine can inhibit undesirable formation reactions such as clay swelling. Common salts used in the preparation of simple brine systems include sodium chloride, calcium chloride and potassium chloride.

Such treatment fluids, and in particular completion brines, are susceptible to contamination from metal ions, such as zinc and iron ions. For example, calcium-based brines often can be contaminated with zinc ions from mixing with zinc-based brines. Zinc's presence in water-based fluids often makes disposal a problem. Additionally, zinc-based brines are also prone to contamination with iron ions resulting from the action of the acidic zinc brines on metal surfaces. These irons may become a concern for formation damage when the ions invade pore spaces and precipitate as a result of the higher pH of the connate water. The ability to remove these contaminant ions without diluting the completion brine or removing the dominant and desired salt ion species is of significant interest to well completion operations.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
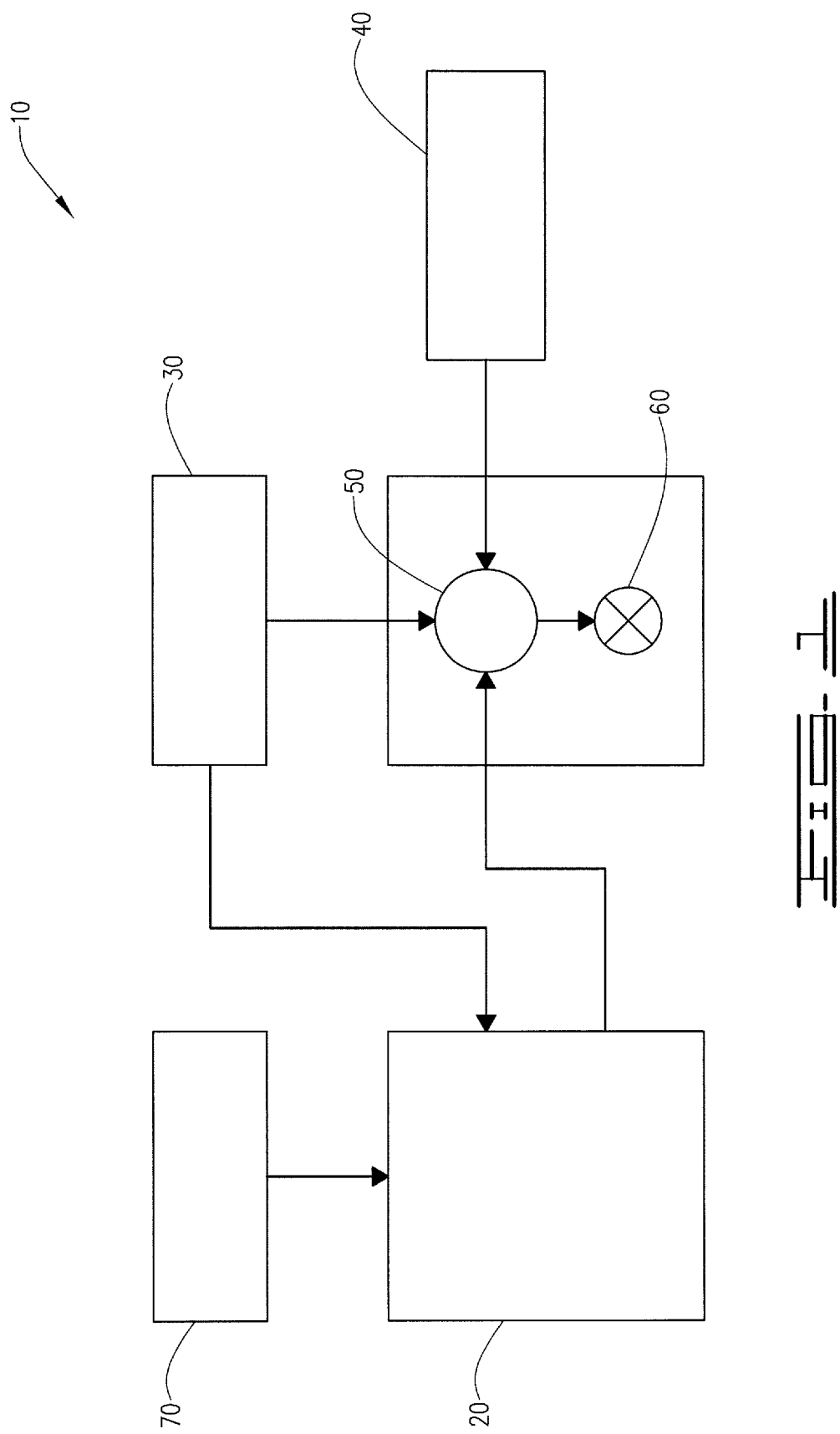
FIG. 1 is a diagram illustrating an example of a fracturing system that can be used in accordance with certain embodiments of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the embodiments and examples described herein. However, it will be understood by those of ordinary skill in the art that the embodiments and examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may have been exaggerated to better illustrate details and features of the present disclosure.

In one aspect, the present disclosure provides a method of treating a well treatment fluid at the surface, wherein the well treatment fluid has been used in a well. In another aspect, the present disclosure provides a method of treating a well. In yet another aspect, the present disclosure provides an aqueous-based well treatment fluid. Unless stated otherwise, as used herein and in the appended claims, a "well" means a wellbore extending into the ground and a subterranean formation penetrated by the wellbore. For example, a well can be an oil well, a natural gas well, a water well or any combination thereof. A "well treatment fluid" means any fluid that is introduced into a well to treat the well or the subterranean formation.

The method of treating a well treatment fluid at the surface comprises retrieving a well treatment fluid from a well, wherein the well treatment fluid has been used in a well treatment operation and contains metal ions, such as cadmium, mercury, barium, bismuth, zinc and/or iron ions, and subsequently introducing a microgel into the well treatment fluid in an amount sufficient to chelate the zinc and/or iron ions.

The method of treating a well disclosed herein comprises introducing microgels into the well to control metal ions. Generally, the microgels will be pumped into the well as a part of a well treatment fluid, which includes an aqueous-based fluid. The microgels are present in the well treatment fluid in an amount sufficient to chelate zinc and/or iron ions dissolved in the aqueous-based fluid. For example, the well treatment fluid of the above methods can be an aqueous-based injection fluid, an aqueous-based drilling mud or other drilling fluid, an aqueous-based pre-flush fluid, an aqueous-based cement composition, an aqueous-based fracturing, acidizing or other stimulation fluid, an aqueous-based gravel packing fluid or other completion fluid, or an aqueous-based workover fluid.

For example, the aqueous-based fluid of the well treatment fluid disclosed herein can comprise fresh water, salt water, or brine (for example, saturated saltwater or produced water). For example, seawater, brackish water, produced water (for example, water produced from a subterranean formation), formation water, treated flowback water, and any combination thereof can be used. For example, the aqueous-based fluid can comprise fresh water. For example, the aqueous-based fluid can comprise salt water. For example, the aqueous-based fluid can comprise brine.

The microgels are polymer microgels. Polymer microgels are gels formed from a network of polymer with a particle size on the order of nanometers to micrometers. For example, the microgel can be produced from ligand-like monomer and a cross-linker. When polymerized together, these components form a gel network that contains chelating ligand functional groups or moiety, which are locked into place in the gel network. The ligand groups are chosen to be selective for a particular metal cation. For example, the microgel particles can be synthesized through a dispersion polymerization process or emulsion polymerization process, which can be tuned to influence particle size such that particle diameter is from about 100 nm to about 300 μm. Through the control of particle diameter and therefore surface area/volume ration, ion absorption rates are also controllable. Specifically, absorption rate increases significantly with decreasing size of the particles. As is known in the art, particle size can be affected by relative solvent concentrations in the organic phase, the stabilizer concentration, the monomer concentration, and pH of the aqueous phase. Generally, the microgel particles can have a diameter of from about 100 nm to about 300 μm, typically from about 200 nm to about 30 μm, and more typically from about 500 nm to 2 μm.

Examples of crosslinkers that can be used during the formation of the polymer microgel include N,N-methylenebisacrylamide, divinylbenzene, poly(ethylene glycol) diacrylate, poly(ethylene glycol) dimethacrylate, 1,6-hexanediol diacrylate, 1,6-hexanediol dimethacrylate, 1,4-butanediol diacrylate, 1,4-butanediol dimethacrylate, thimethylolpropane triacrylate, tetramethylolpropane tetraacrylate, and any combination thereof.

The polymers of this disclosure are ones having a polymeric backbone bearing at least one moiety where such moiety is a chelating agent or chelating ligand. The chelating ligand functional groups or moieties of this disclosure are cheating agents capable of bonding with metal ions. In some embodiments the chelating ligand group will be selected to bond to one or more metal ions selected from the group of cadmium, mercury, barium, bismuth, zinc and iron ions. In other embodiments, the chelating ligand group will be selected to bond to a metal ion selected from the group consisting of zinc or iron. For example, a moiety can be capable of bonding to $Zn^{2+}$ ions. Alternatively, a moiety can be capable of bonding to $Fe^{3+}$ ions. Of particular usefulness for zinc ions are microgels having polymers with moieties based on imidazole. The polymers can be homopolymers or copolymers which have imidazole moieties. For example, the polymer can be polyvinyl imidazole (PVIm), which has the following repeating unit:

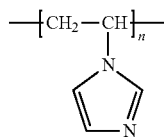

Of particular usefulness for iron ions are microgels having polymers with moieties based on arylic acid, 2-acrylamido-2-methylpropane sulfonate, or phophonic acid. The polymers can be homopolymers or copolymers which have these moieties. For example, the polymer can be poly acrylic acid (PAAc), which has the following repeating unit:

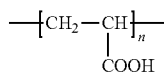

For example, the polymer can be poly(2-acrylamido-2-methylpropane sulfonate) (PAMPS), which has the following repeating unit:

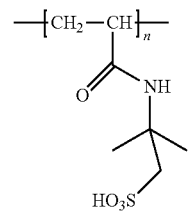

For example, the polymer can be poly(vinylphosphonic acid) (PVPA), which has the following repeating unit:

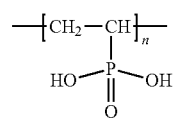

Typically, the polymers can be ones produced from the polymerization of vinyl monomers, such as vinyl monomers having a moiety selected from imidazole, acrylic acid, 2-acrylamido-2-methylpropane sulfonic acid and phosphonic acid with crosslinkers. In some applications, the polymers will be copolymers of one or more of the aforementioned vinyl monomers with another suitable monomer, such as N,N-dimethylacrylamide (DMAA), acrylamide, 2-hydroxyethyl methacrylate, 2-hydroethyl acrylate, poly(ethyl glycol) acrylate, or poly (ethyl glycol) methacrylate. For example, the polymers can be a copolymer of N,N-dimethylacrylamide and vinyl phosphonic acid (P(DMAA-VPA)), a copolymer of N,N-dimethylacrylamide and vinyl imidazole (P(DMAA-VIm)), a copolymer of N,N-dimethylacrylamide and vinyl acrylic acid (P(DMAA-VAAc)), or a copolymer of N,N-dimethylacrylamide and 2-acrylamido-2-methylpropane sulfonate (P(DMAA-PAMPS)).

In other embodiments, the microgel can comprise a combination of different polymers. For example, the microgel can comprise PVIm polymer chains (or particles) and polymer chains (or particles) selected from one or more of PAAc, PAMPS and PVPA. While such combinations are within the scope of the current invention, it should be realized that certain combinations may decrease selectivity. For example mixing PVIm with PAAc could be disadvantageous for removing iron ions from zinc/iron mixtures.

The specific amount of the microgel present in the well treatment fluid will vary depending on the amount of free metal ions that may need to be chelated, whether the polymer microgel is used to increase the viscosity of the well treatment fluid, and the particular application of the method and the conditions of the well.

For example, the microgel agent can be present in the well treatment fluid in an amount in the range of from about 0.1 pound per 100 gallon to about 10 pounds per gallon of the aqueous-based fluid. For example, the microgel can be present in the well treatment fluid in an amount in the range of from about 0.5 pound per gallon to about 10 pounds per gallon of the aqueous-based fluid. For example, the microgel can be present in the well treatment fluid in an amount in the range of from about 1 pound per gallon to about 5 pounds per gallon of the aqueous-based fluid.

In addition to the aqueous-based fluid and microgel, the treatment fluid may comprise a polymer gelling agent so that the treatment fluid is a gel. A "gel" means a semi-rigid (gelatinous) colloidal dispersion of a solid within an aqueous-based fluid. As used herein and in the appended claims, a "polymer gelling agent" means a polymer that font's a gel when combined with an aqueous-based fluid. Examples of polymer gelling agents that can be used include polysaccharides such as galactomannan gums, polyacrylamide and other acrylamide-based gelling agents, guar and guar derivatives, including hydroxypropyl guar, carboxymethyl guar and carboxymethyl hydroxypropyl guar, cellulose and cellulose derivatives, xanthan, diutan, hydroxypropyl cellulose phosphate, hydroxypropyl starch phosphate and synthetic polymer gelling agents and combinations thereof.

The amount of the gelling agent present in the well treatment fluid used in the method disclosed herein can vary depending on the additional components of the well treatment fluid and the particular application. For example, the gelling agent is generally present in the well treatment fluid in an amount in the range of from about 1 pound per 1000 gallons to about 500 pounds per 1000 gallons of the aqueous-based fluid. For example, the gelling agent is generally present in the well treatment fluid in an amount in the range of from about 10 pounds per 1000 gallons to about 200 pounds per 1000 gallons of the aqueous-based fluid. For example, the gelling agent is generally present in the well treatment fluid in an amount in the range of from about 25 pounds per 1000 gallons to about 100 pounds per 1000 gallons of the aqueous-based fluid.

The gelled well treatment fluids disclosed herein may vary widely in density. One of ordinary skill in the art with the benefit of this disclosure will recognize the particular density that is most appropriate for a particular application. The desired density for a particular gelled well treatment fluid may depend on characteristics of the well, including the hydrostatic pressure required to control the fluids of the subterranean formation during placement of the gelled well treatment fluids, and the hydrostatic pressure which will damage the subterranean formation.

For example, the well treatment fluid used in the method disclosed herein can further comprise a gel crosslinker to crosslink the gelling agent of the well treatment fluid and thereby further increase the viscosity of the well treatment fluid. For example, the use of a gel crosslinker to crosslink the gelling agent of the well treatment fluid and thereby further increase the viscosity of the well treatment fluid can be particularly beneficial in drilling operations or in fracturing operations. Examples of gel crosslinkers that can be used include boric acid, disodium octaborate tetrahydrate, sodium diborate, pentaborates, ulexite and colemanite, compounds that can supply zirconium IV ions (such as, for example, zirconium lactate, zirconium acetate lactate, zirconium lactate triethanolamine, zirconium carbonate, zirconium acetylacetonate, zirconium malate, zirconium citrate, and zirconium diisopropylamine lactate), compounds that can supply titanium IV ions (such as, for example, titanium lactate, titanium malate, titanium citrate, titanium ammonium lactate, titanium triethanolamine, and titanium acetylacetonate), aluminum compounds including, for example, aluminum lactate and aluminum citrate, antimony compounds, chromium compounds, iron compounds, copper compounds, zinc compounds, and any combination thereof. For example, the above crosslinkers are particularly suitable for use in connection with guar and its derivatives and polyacrylamide-based gelling agents. Brines and compounds generating calcium ions, magnesium ions or polyvalent ions can also function as gel crosslinkers to crosslink the gelling agent of the well treatment fluid disclosed herein. For example, it can be beneficial to crosslink the gel when the well treatment fluid is a fracturing fluid.

The amount of the gel crosslinker added to the well treatment fluid can vary depending on the amount of the gelling agent present in the well treatment fluid, the well conditions, the particular application and other factors known to those skilled in the art with the benefit of this disclosure. For example, the gel crosslinker can be included in the well treatment fluid in an amount in the range of from about 0.0001 pound per 1000 gallons to about 100 pounds per 1000 gallons of the aqueous-based fluid. For example, the gel crosslinker can be included in the well treatment fluid in an amount in the range of from about 0.001 pound per 1000 gallons to about 100 pounds per 1000 gallons of the aqueous-based fluid. For example, the gel crosslinker can be included in the well treatment fluid in an amount in the range of from about 0.01 pound per 1000 gallons to about 20 pounds per 1000 gallons of the aqueous-based fluid.

Additional components that can be included in the well treatment fluid used in the method disclosed herein include gel breakers, friction reducing agents, clay control agents, buffers and other pH control agents, biocides, bactericides, additional scale inhibitors, weighting materials, fluid loss control additives, bridging materials, corrosion inhibitors, non-emulsifiers, additional surfactants, proppant particulates, and gravel for forming gravel packs. As will be understood by those skilled in the art with the benefit of this disclosure, the additional components and the amounts thereof that are utilized will vary depending on the particular application in which the well treatment fluid is used.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. By way of example and not limiting on the downhole operation in which the compositions and methods are used, FIGS. 1 and 2 illustrate a typical fracturing operation.

Figure 2:
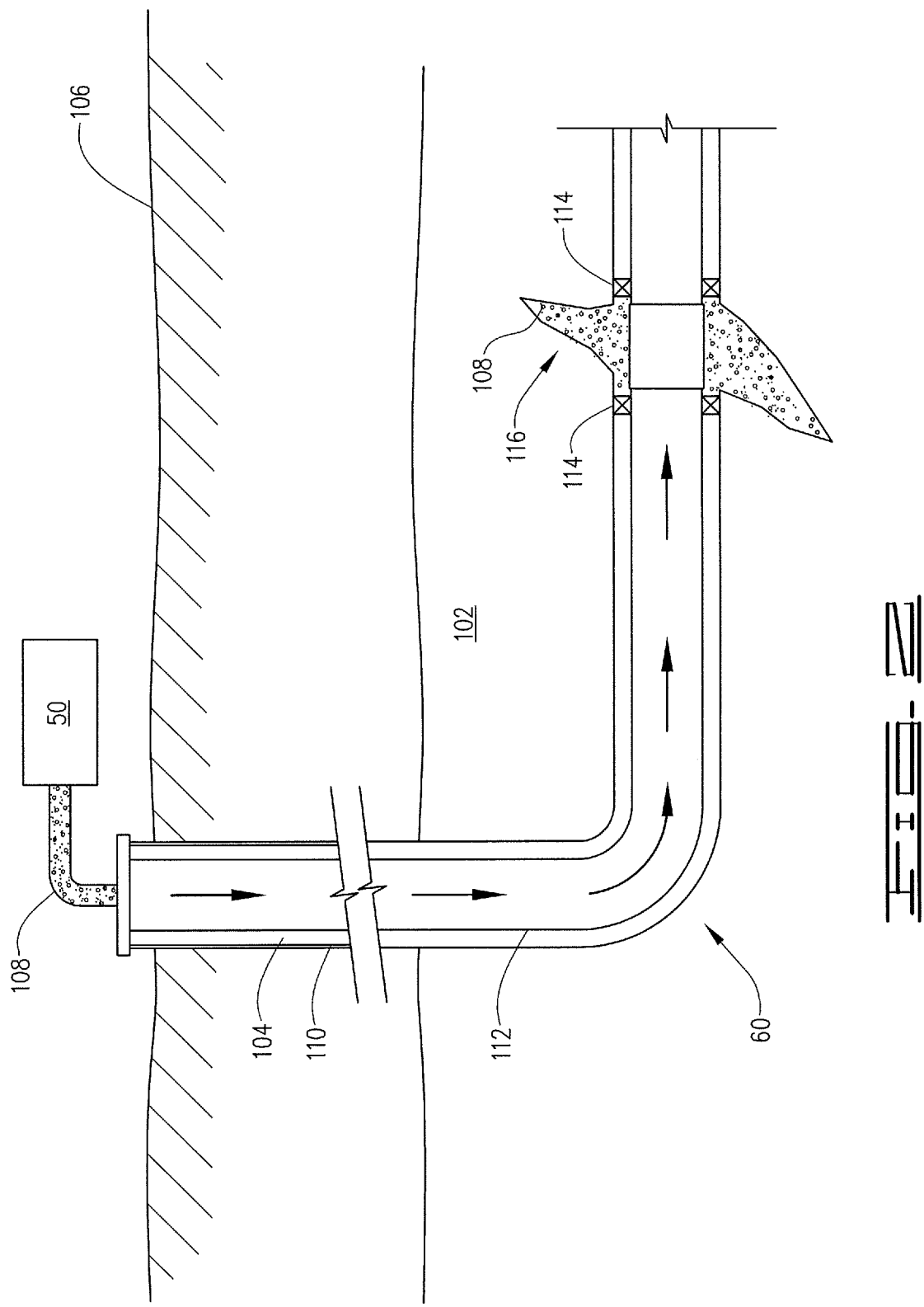
FIG. 2 is a diagram illustrating an example of a subterranean formation in which a fracturing operation can be performed in accordance with certain embodiments of the present disclosure.

For example, and with reference to FIG. 1, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing the pad fracturing fluid and proppant slurry used in the disclosed method), a fluid source 30, a proppant source 40, and a pump and blender system 50. The system 10 resides at the surface at a well site where a well 60 is located. For example, the fracturing fluid producing apparatus 20 can combine a gel pre-cursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant for combination with the fracturing fluid (for example, the pad fluid and proppant slurry) as appropriate. The system may also include an additive source 70 that provides one or more additives (e.g., the disclosed microgel, as well as gelling agents, weighting agents, and/or other optional additives as discussed above) to alter the properties of the fracturing fluid (for example, the pad fluid and/or proppant slurry). For example, the other additives 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particulates, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on the fly" methods. Thus, for example, the pumping and blender system 50 can provide just fracturing fluid (for example, the pad fluid) into the well at some times, just proppant slurry at some times, just proppant particulates at other times, and combinations of those components at yet other times.

FIG. 2 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 2 shows two packers 114, one defining an uphole boundary of the interval and one defining the downhole end of the interval.

When the fracturing fluid 108 (for example, the pad fracturing fluid) is introduced into wellbore 104 (e.g., in FIG. 2, the area of the wellbore 104 between packers 114) at a sufficient hydraulic pressure, one or more primary fractures 116 are created in the subterranean zone 102. The proppant particulates in the fracturing fluid 108 (for example, the proppant slurry) enter the fractures 116 where they may remain after the fracturing fluid flows out of the wellbore, as described above. These proppant particulates may "prop" fractures 116 such that fluids may flow more freely through the fractures 116. The proppant particulates "prop" fractures 116 such that fluids may flow more freely through the fractures 116.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In an additional example, the additives may be used to treat a well treatment fluid that has been used in a well treatment process. For example, the microgel may be used in to treat a well treatment fluid that us been used in a drilling, fracturing, or other well treatment process.

Figure 3:
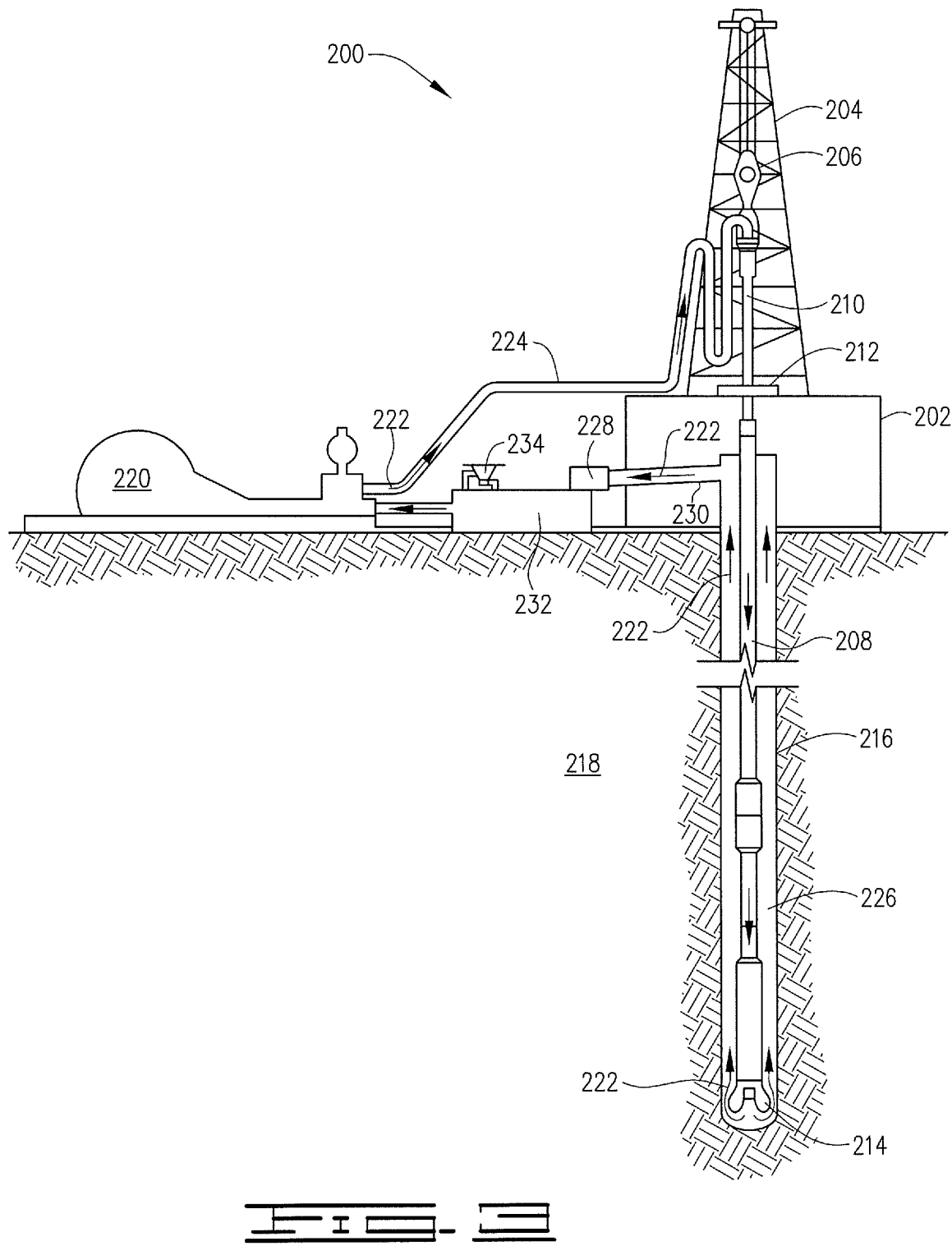
FIG. 3 is a diagram illustrating an example of drilling operation in which the microgels of the current disclosure can be used.

When used to treat a well treatment fluid that has been used in a well treatment process, the exemplary microgels disclosed herein may directly or indirectly affect one or more components or pieces of equipment associated with the preparation, delivery, recapture, recycling, reuse, and/or disposal of the disclosed well treatment fluids. For example, and with reference to FIG. 3, the disclosed microgels may directly or indirectly affect one or more components or pieces of equipment associated with an exemplary wellbore drilling assembly 200, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 202 that supports a derrick 204 having a traveling block 206 for raising and lowering a drill string 208. The drill string 208 may include, but is not limited to, drill pipe and coiled tubing, as generally known to those skilled in the art. A kelly 210 supports the drill string 208 as it is lowered through a rotary table 212. A drill bit 214 is attached to the distal end of the drill string 208 and is driven either by a downhole motor and/or via rotation of the drill string 208 from the well surface. As the bit 214 rotates, it creates a borehole 216 that penetrates various subterranean formations 218.

A pump 220 (e.g., a mud pump) circulates the well treatment fluid, in this case a drilling fluid 222, through a feed pipe 224 and to the kelly 210, which conveys the drilling fluid 222 downhole through the interior of the drill string 208 and through one or more orifices in the drill bit 214. The well treatment fluid, in this case drilling fluid 222, is then circulated back to the surface via an annulus 226 defined between the drill string 208 and the walls of the borehole 216.

At the surface, the recirculated or spent drilling fluid 222 exits the annulus 226 and may be conveyed to one or more fluid processing unit(s) 228 via an interconnecting flow line 230. After passing through the fluid processing unit(s) 228, a "cleaned" drilling fluid 222 is deposited into a nearby retention pit 232 (i.e., a mud pit). While illustrated as being arranged at the outlet of the borehole 216 via the annulus 226, those skilled in the art will readily appreciate that the fluid processing unit(s) 228 may be arranged at any other location in the drilling assembly 200 to facilitate its proper function, without departing from the scope of the disclosure.

One or more of the disclosed microgels may be added to the drilling fluid 222 in fluid processing unit(s) 228 so as to chelate metal ions. For example, the drilling fluid can be tested for ion contamination. If the test indicates that the treatment fluid is contaminated, the drilling fluid can be transferred to a treatment tank where the microgel is added to remove the unwanted ions. The drilling fluid can be stored statically, in the tank or can be circulated, rolled, aerated, or undergo similar treatment. The drilling fluid is retained in the tank for a time sufficient to remove a portion of the ion atoms. Typically, at least 90% of the contaminating ions will be removed; however, in some operations less will be removed such as 80%, 70%, 60%, 50% or even as low as 10% or less. In some embodiments after removal of a portion of the contamination ions, the drilling fluid is filtered or screened so as to remove the microgel from the drilling fluid, thus effectively physically removing the ions from the drilling fluid.

Alternatively, one or more of the disclosed micro gels may be added to the drilling fluid 222 via a mixing hopper 234 communicably coupled to or otherwise in fluid communication with the retention pit 232. The mixing hopper 234 may include, but is not limited to, mixers and related mixing equipment known to those skilled in the art. In other embodiments, however, the disclosed microgels may be added to the drilling fluid 222 at any other location in the drilling assembly 200. In at least one embodiment, for example, there could be more than one retention pit 232, such as multiple retention pits 232 in series. Moreover, the retention pit 232 may be representative of one or more fluid storage facilities and/or units where the disclosed microgels may be stored, reconditioned, and/or regulated until added to the drilling fluid 222.

While the microgels are described in this drilling operation as being used to remove ions at any stage of the drilling operations, the microgels can generally be used during drilling and/or well completion operations. For example, the use of microgels can be beneficial to treat the treatment fluid during the final phases of well construction. Often in such phases, saturated salt systems or brines are used primarily for solids-free weighting of the fluids. These brines are generally recycled after use and can become contaminated with metal ions, such as zinc or iron.

As mentioned above, the disclosed microgels may directly or indirectly affect the components and equipment of the drilling assembly 200 or of well completion operations. For example, the disclosed mircogels may directly or indirectly affect the fluid processing unit(s) 228 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 228 may further include one or more sensors, gauges, pumps, compressors, and the like used to store, monitor, regulate, and/or recondition the exemplary microgels.

The disclosed microgels may directly or indirectly affect the pump 220, which representatively includes any conduits, pipelines, trucks, tubulars, and/or pipes used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed microgels may also directly or indirectly affect the mixing hopper 234 and the retention pit 232 and their assorted variations.

The disclosed microgels may also directly or indirectly affect the various downhole equipment and tools that may come into contact with the microgels such as, but not limited to, the drill string 208, any floats, drill collars, mud motors, downhole motors and/or pumps associated with the drill string 208, and any MWD/LWD tools and related telemetry equipment, sensors or distributed sensors associated with the drill string 208. The disclosed microgels may also directly or indirectly affect any downhole heat exchangers, valves and corresponding actuation devices, tool seals, packers and other wellbore isolation devices or components, and the like associated with the borehole 216. The disclosed microgels may also directly or indirectly affect the drill bit 214, which may include, but is not limited to, roller cone bits, PDC bits, natural diamond bits, any hole openers, reamers, coring bits, etc.

While not specifically illustrated herein, the disclosed microgels may also directly or indirectly affect any transport or delivery equipment used to convey the microgels to the drilling assembly 200 such as, for example, any transport vessels, conduits, pipelines, trucks, tubulars, and/or pipes used to fluidically move the microgels from one location to another, any pumps, compressors, or motors used to drive the microgels into motion, any valves or related joints used to regulate the pressure or flow rate of the microgels, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

For Example 1, 0.05 g of dried ponlyvinyl imidazole (PVIm) microgel particles were soaked in 5 ml of a solution containing about 1 wt % $CaCl_2$ and about 0.1 wt % $ZnCl_2$ at varying pH. HCl and NaOH were used to adjust the pH. For comparison purposes, a control solution was prepared containing about 1 wt % $CaCl_2$ and about 0.1 wt % $ZnCl_2$ but without any microgel particles. The control solution was at a pH of 5. Ion concentrations were measured by inductively coupled plasma mass spectrometry. The results are provided in Table 1 below.

As can be seen, the PVIm microgel was successful at removing over 95% of the $Zn^{2+}$ ions but resulted in no appreciable absorption of the $Ca^{2+}$ ions. Additionally, the selectivity remained high as pH approached the pKa of protonation of the PVIm microgel, pH<pKa~6.

TABLE 1

| pH | Remaining $Ca^{2+}$ (wt %) | Remaining $Zn^{2+}$ (wt %) |
|---|---|---|
| Control | 0.376 | 0.04900 |
| 1.5 | 0.373 | 0.00068 |
| 2.4 | 0.377 | 0.00014 |
| 3.6 | 0.371 | 0.00012 |
| 4.1 | 0.374 | 0.00013 |

Example 2

For Example 2, 0.05 g of dried PVIm microgel particles were soaked in 5 ml of a solution containing diffing concentrations of $ZnCl_2$. The ion concentrations in the aqueous phase were measured prior to introduction of the PVIm microgel and at 240 minutes after introduction of the PVIm microgel. Ion concentrations were measured by inductively coupled plasma mass spectrometry. The results are provided in Table 2 below.

Total absorption was found to be very near the theoretical maximum for a 10% wt solution, given the 1:1 complexation ratio between imidazole and $Zn^{2+}$ ions.

TABLE 2

| Initial $ZnCl_2$ Concentration (wt %) | Initial $Zn^{2+}$ (wt %) | Remaining $Zn^{2+}$ (wt %) | Capacity $Zn^{2+}$/µgel(mg/g) |
|---|---|---|---|
| 0.1% | 0.055 | 0.0054 | 48 |
| 1% | 0.54 | 0.3843 | 164 |
| 5% | 2.54 | 2.35 | 190 |
| 10% | 5.48 | 4.85 | 610 |

Example 3

For Example 3, recycling of the PVIm microgel was tested. 0.05 g of PVIm microgel was added to a 1 wt % solution of $ZnCl_2$. To recycle the microgel which had absorbed $Zn^{2+}$ ions, the microgel was centrifuged, then washed with low pH HCl solution followed by a wash with deionized water. After each recycle the PVIm microgel was introduced back into the solution of $ZnCl_2$. The results are shown in Table 3 below.

At a 0.5 wt % concentration of $Zn^{2+}$ in the starting microgel, it was found that the microgel could be recycled at least five times with no degradation in its $Zn^{2+}$ absorbing capability.

TABLE 3

| Cycles | Initial $Zn^{2+}$ (wt %) | Remaining $Zn^{2+}$ (wt %) | Absorbed $Zn^{2+}$/µgel(mg/g) |
|---|---|---|---|
| $1^{st}$ | 0.54 | 0.38 | 160 |
| $2^{nd}$ | 0.54 | 0.35 | 190 |
| $3^{rd}$ | 0.54 | 0.37 | 173 |

TABLE 3-continued

| Cycles | Initial $Zn^{2+}$ (wt %) | Remaining $Zn^{2+}$ (wt %) | Absorbed $Zn^{2+}$/µgel(mg/g) |
|---|---|---|---|
| $4^{th}$ | 0.54 | 0.39 | 154 |
| $5^{th}$ | 0.54 | 0.40 | 140 |

Example 4

For Example 4, four solutions of 5 mL of 1 wt % $ZnCl_2$ and 0.1 wt % $FeCl_3$ were prepared. The first solution was used as a control solution and no microgel was added. To the second solution, 0.05 g of dried poly acrylic acid (PAAc) microgel particles were added. Similarly, 0.05 g dried poly (2-acrylamido-2-methylpropane sulfonate) (PAMPS) was added to the third solution and 0.05 g of a vinylphosphonic acid and N,N-dimethylacylamide copolymer were added to the fourth solution. Each microgel was allowed to soak for 240 minutes. Ion concentrations were measured by inductively coupled plasma mass spectrometry. The results are provided in Table 4 below.

As can be seen, these microgels selectively removed $Fe^{3+}$ ions and had a negligible effect on the $Zn^{2+}$ ion concentration.

TABLE 4

| Microgel Sample | $Zn^{2+}$ (wt %) | $Fe^{3+}$ (wt %) | Absorbed m$Zn^{2+}$/mgel (mg/g) | Absorbed m$Fe^{3+}$/mgel (mg/g) |
|---|---|---|---|---|
| Control | 0.57 | 0.0568 | — | — |
| PAAc | 0.65* | 0.0002 | 10 | 56 |
| PAMPS | 0.54 | 0.0174 | 28 | 39 |
| P(DMAA-VPA) | 0.56 | 0.00002 | 12 | 56.7 |

*Apparent weight gain indicates the sample took on extra water.

In accordance with the above disclosure, some specific embodiments will now be described. In according to one aspect of the disclosure there is disclosed an aqueous-based well treatment fluid, which can be used to control metal ions in a well. In some embodiments, the aqueous-based well treatment fluid can be used to control zinc or iron ions in a well. The aqueous-based well treatment fluid comprises an aqueous-based fluid and a polymer microgel.

In accordance with another aspect of the disclosure, there is a method of treating a well treatment fluid which has been used downhole in a well for a well treatment operation. The method comprises recirculating the well treatment fluid to the surface from downhole in the well, wherein the thus recirculated well treatment fluid contains metal ions. A polymer microgel is then added to the recirculated well treatment fluid so that a portion of the metal ions are chelated to produce an amended treatment fluid. Subsequently, the amended treatment fluid can be reintroduced downhole into the well for the well treatment operations. In some embodiments, the microgel is separated from the amended treatment fluid prior to the step of reintroducing the treatment fluid. In some embodiments, the well treatment fluid will contain zinc or iron ions, and the polymer microgel is added to the recirculated well treatment fluid so that a portion of the zinc or iron ions are chelated to produce the amended treatment fluid.

In accordance to another aspect of the disclosure, there is a method of controlling metal ions during treatment of a well. The method comprises pumping downhole into the well a polymer microgel. In many embodiments of the method, the polymer microgel can be pumped downhole as part of a well treatment fluid, which includes an aqueous-based fluid. In some embodiments the method controls zinc or iron ions during treatment of a well.

The microgel of embodiments of the above aspects comprises a plurality of polymer particles, each polymer particle having a polymeric backbone bearing at least one moiety where such moiety is a chelating agent capable of boding with a metal ion, in other words with at least one type of metal ion. In some embodiments the metal ion is selected from the group consisting of zinc ions and iron ions. In some embodiments, the moiety is selected from the group consisting of imidazole, acrylic acid, 2-acrylamido-2-methylpropane sulfonic acid and phosphonic acid.

Also in the above embodiments, the polymeric backbone can be produced from the polymerization of vinyl monomers. In such case, the polymer particles can include repeating vinyl units with a moiety selected from the group consisting of imidazole, acrylic acid, 2-acrylamido-2-methylpropane sulfonic acid and phosphonic acid.

In the above embodiments, the polymer particles can be copolymers of N,N-dimethylacrylamide and a monomer selected from the group consisting of vinyl imidazole, vinyl acrylic acid, poly 2-acrylamido-2-methylpropane sulfonic acid and vinyl phosphonic acid.

In the above embodiments, the microgel can be made from one or more types of polymer particles. The polymer particles are selected from the group consisting of polyvinyl imidazole, polyvinyl acrylic acid, poly 2-acrylamido-2-methylpropane sulfonic acid, polyvinyl phosphonic acid, and mixtures thereof.

In each of the above embodiments, using an aqueous-based fluid as part of the well treatment fluid, the polymer microgel can be present in the well treatment fluid in an amount in the range from about 0.1 pound per gallon to about 10 pounds per gallon of the aqueous-based fluid. Additionally, the well treatment fluid can further comprise a polymer gelling agent present in the well treatment fluid in an amount sufficient to form a gel and increase the viscosity of the well treatment fluid. The polymer microgel can also function to increase the viscosity of the well treatment fluid and can be present in the well treatment fluid in an amount sufficient to chelate metal ions dissolved in the aqueous-based fluid.

In the above embodiments, the microgel can control zinc ions. The zinc ions can be $Zn^{2+}$ ions. In such embodiments, the polymeric backbone can bear at least one moiety where such moiety is a chelating agent capable of bonding with such zinc ions. In some embodiments, the moiety is imidazole.

Additionally, the polymeric backbone can be produced from the polymerization of vinyl imidazole such that the polymer particles include repeating vinyl units with a imidazole moiety. Also in the above embodiments, the polymer particles can be copolymers of N,N-dimethylacryamide and vinyl imidazole.

In the above embodiments, the microgel can control iron ions. The iron ions can be $Fe^{3+}$ ions. In such embodiments, the polymeric backbone can bear at least one moiety where such moiety is a chelating agent capable of bonding with such iron ions. In some embodiments, the moiety is selected from the group comprising acrylic acid, 2-acrylamido-2-methylpropane sulfonic acid and phosphonic acid.

The polymeric backbone can be produced from the polymerization of vinyl monomers. Also, the polymer particles can include repeating vinyl units with a moiety selected from the group consisting of acrylic acid, 2-acrylamido-2-methylpropane sulfonic acid and phosphonic acid.

Also, the polymer particles can be copolymers of N,N-dimethylacrylamide and a monomer selected from the group consisting of vinyl acrylic acid, 2-acrylamido-2-methylpropane sulfonic acid and vinyl phosphonic acid.

In the above embodiments, the microgel can be made from one or more types of polymer particles. The polymer particles selected from the group consisting of polyvinyl acrylic acid, poly 2-acrylamido-2-methylpropane sulfonic acid, polyvinyl phosphonic acid, and mixtures thereof.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of controlling contaminant metal ions in a treatment fluid having dominant metal ions during treating of a well, comprising:
   pumping downhole into the well the treatment fluid, the treatment fluid comprising salt water or brine in which there is the dominant metal ions and the contaminant metal ions, wherein metal ions of the dominant metal ions are different from metal ions of the contaminant metal ions, and
   introducing into the treatment fluid a polymer microgel comprising a plurality of polymer particles, each polymer particle having a polymeric backbone bearing at least one moiety where such moiety is a chelating agent capable of selectively bonding with the contaminant ions over the dominant metal ions, wherein the polymer microgel is introduced so as to reduce contaminant metal ions by selectively chelating with the contaminant metal ions instead of the dominant metal ions to thus leave the dominant metal ions in the well treatment fluid.

2. The method of claim 1, wherein the method controls the contaminant metal ions are zinc ions and the dominant metal ions are calcium ions.

3. The method of claim 1, wherein the contaminant metal ions are zinc ions and the polymeric backbone is produced from the polymerization of vinyl monomers, and wherein the polymer particles include repeating vinyl units with the at least one moiety being imidazole.

4. The method of claim 1, wherein the contaminant metal ions are iron ions and the polymeric backbone is produced from the polymerization of vinyl monomers, and wherein the polymer particles include repeating vinyl units with a moiety selected from the group consisting of acrylic acid, 2-acrylamido-2-methylpropane sulfonic acid and phosphonic acid.

5. The method of claim 1, wherein the contaminant metal ions are iron ions and the dominant metal ions are zinc ions and wherein the polymer particles are copolymers of N,N-dimethylacrylamide and a monomer selected from the group consisting of acrylic acid, 2-acrylamido-2-methylpropane sulfonic acid and vinyl phosphonic acid.

6. The method of claim 1, wherein dominant metal ions are zinc and the contaminant metal ions are iron and wherein the polymer microgel is made of polymer particles selected from the group consisting of poly acrylic acid, poly 2-acrylamido-2-methylpropane sulfonic acid, polyvinyl phosphonic acid, and mixtures thereof.

7. The method of claim 1, wherein the polymer microgel is pumped downhole as part of the well treatment fluid, which has dominant metal ions that are calcium ions, and wherein the contaminant metal ions are zinc ions.

8. The method of claim 7, wherein the polymeric backbone is produced from the polymerization of vinyl monomers, and wherein the polymer particles include repeating vinyl units with a moiety consisting of imidazole.

9. An aqueous-based well treatment fluid, comprising:
a salt water or brine in which there is dominant metal ions;
a polymer gelling agent; and
a polymer microgel comprising a plurality of polymer particles, each polymer particle having a polymeric backbone bearing at least one moiety where such moiety is a chelating agent capable of bonding with a contaminant metal ion, wherein the contaminant metal ion is not the same as the dominant metal ions and wherein the moiety selectively chelates with the contaminant metal ions instead of the dominant metal ions to thus leave the dominant metal ions in the well treatment fluid.

10. The treatment fluid of claim 9, wherein the contaminant metal ions are zinc and the dominant metal ions are calcium.

11. The treatment fluid of claim 10, wherein the moiety is imidazole.

12. The treatment fluid of claim 9, wherein the dominant metal ions are zinc and the contaminant metal ions are iron and wherein the polymer particles include repeating vinyl units with a moiety selected from the group consisting of acrylic acid, 2-acrylamido-2-methylpropane sulfonic acid and phosphonic acid.

13. The treatment fluid of claim 9, wherein the polymer microgel is made of polyvinyl imidazole particles.

14. A method of controlling contaminant metal ions during treatment of a well, comprising:
recirculating a treatment fluid to the surface from downhole in the well, wherein the well treatment fluid comprises salt water or brine in which there is dominant metal ions and the thus recirculated well treatment fluid contains contaminant metal ions which are different from metal ions of the dominant metal ions;
adding a polymer microgel to the recirculated well treatment fluid, wherein the polymer microgel comprises a plurality of polymer particles, each polymer particle having a polymeric backbone bearing at least one moiety where such moiety is a chelating agent capable of selectively bonding with the contaminant metal ion and not the dominant metal ion, and wherein the polymer microgel reduces the contaminant metal ions by selectively chelating with the contaminant metal ions instead of the dominant metal ions to thus leave the dominant metal ions in the well treatment fluid.

15. The method of claim 14, wherein the contaminant metal ions are zinc ions and the dominant metal ions are calcium metal ions and wherein the method controls zinc ions during treatment of a well.

16. The method of claim 14, wherein the method further comprises:
separating the polymer microgel from the recirculated treatment fluid to produce an amended treatment fluid having less contaminant metal ions than the recirculated treatment fluid before the addition of the polymer gel; and
introducing the amended treatment fluid into the well.

17. The method of claim 14, wherein the contaminant metal ions are zinc ions and the moiety is imidazole.

18. The method of claim 14, wherein the contaminant metal ions are zinc ions and the polymeric backbone is produced from the polymerization of vinyl monomers, and wherein the polymer particles include repeating vinyl units with a moiety consisting of imidazole.

19. The method of claim 14, wherein the dominant metal ions are zinc ions and the contaminant metal ions are iron ions and wherein the polymer particles are copolymers of N,N-dimethylacrylamide and a monomer selected from the group consisting of acrylic acid, 2-acrylamido-2-methylpropane sulfonic acid and vinyl phosphonic acid.

20. The method of claim 14, wherein the dominant metal ions are calcium ions and the contaminant metal ions are zinc ions and wherein the polymer microgel is made of polyvinyl imidazole particles.

* * * * *

UNITED STATES PATENT AND TRADEMARK OFFICE
CERTIFICATE OF CORRECTION

| | | |
|---|---|---|
| PATENT NO. | : 11,111,427 B2 | Page 1 of 1 |
| APPLICATION NO. | : 16/765322 | |
| DATED | : September 7, 2021 | |
| INVENTOR(S) | : Deville et al. | |

It is certified that error appears in the above-identified patent and that said Letters Patent is hereby corrected as shown below:

In the Specification

Column 5, Line 2, replace "font's" with --forms--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*